US005765862A

United States Patent [19]
Bentley

[11] Patent Number: 5,765,862
[45] Date of Patent: Jun. 16, 1998

[54] FASTENING SYSTEM FOR AIR BAG DEPLOYMENT DOORS

[75] Inventor: Fred M. Bentley, Layton, Utah

[73] Assignee: Autoliv ASP, Inc., Ogden, Utah

[21] Appl. No.: 819,927

[22] Filed: Mar. 18, 1997

[51] Int. Cl.$^6$ .................................................. B60R 21/20
[52] U.S. Cl. ................................. 280/728.3; 280/728.2
[58] Field of Search ........................... 280/728.2, 728.3, 280/732; 411/508, 509, 510, 970; 24/453, 623

[56] References Cited

U.S. PATENT DOCUMENTS

| | | | |
|---|---|---|---|
| 5,211,421 | 5/1993 | Catron et al. | 280/728.2 |
| 5,403,034 | 4/1995 | Gans et al. | 280/728.1 |
| 5,458,365 | 10/1995 | Rogers et al. | 280/728.3 |
| 5,496,060 | 3/1996 | Whited | 280/728.3 |
| 5,590,900 | 1/1997 | Duran et al. | 280/728.2 |
| 5,613,701 | 3/1997 | Bentley et al. | 280/728.3 |
| 5,624,130 | 4/1997 | Ricks | 280/728.2 |
| 5,651,562 | 7/1997 | Hagen et al. | 280/728.3 |

Primary Examiner—Christopher P. Ellis

[57] ABSTRACT

A vehicle air bag installation including an inflatable air bag assembly mounted in a rectangular opening in the vehicle instrument panel for deployment of the air bag through the opening. A rectangular door engages a recessed abutment around the opening when closed. A plurality of spaced apertures are provided in spaced brackets supported by the instrument panel in a recessed region for receiving fasteners for attaching the door to the instrument panel. The fasteners comprise thermoplastic resin bodies having a cylindrical bulbous head, flared wings or shoulders extending from the bulbous head for providing height alignment, a lower portion for centering the fastener in the aperture comprising a plurality of gripping teeth formed as an angled flute for securing the door to the instrument panel. Integral channels molded into the underside of the cover substrate releasably engage the heads of the fasteners. The door having the fasteners secured to channels in its underside is assembled to the instrument panel by aligning the fasteners with the apertures in the spaced brackets. The fasteners are inserted into the apertures and are secured therein by the gripping teeth portion of the fastener to prevent inadvertent premature movement of the door. Upon deployment of the air bag, the door is pushed out of the instrument panel surface with the fasteners disengaging from the channels in the underside of the door.

11 Claims, 2 Drawing Sheets

FASTENING SYSTEM FOR AIR BAG DEPLOYMENT DOORS

BACKGROUND OF THE INVENTION

1. Field of the Invention

This invention relates to occupant restraint systems. More particularly, the invention relates to the mounting of a passenger side air bag cover for an inflatable air bag that is installed in a vehicle instrument panel.

2. Description of the Related Art

Passenger vehicles are provided with inflatable restraint systems for both the vehicle driver and front seat passenger. Such systems are commonly known as dual air bag systems. The air bag for the passenger side includes a gas generator or inflator and a reaction canister that are located in a recess in the instrument panel and deploys through an opening that is provided in the instrument panel.

Normally the instrument panel comprises a metal support structure covered by a panel that includes a rigid substrate on which is mounted a resilient foam pad having a flexible plastic decorative skin covering. The instrument panel support mounts the air bag assembly in the recess and incorporates a cover or door which closes the air bag deployment opening.

The deployment door is a separate rectangular panel that is flush mounted in a rectangular opening in the surrounding panel area so that it can be opened and moved out of the way upon inflation of the air bag, by the deploying air bag.

It is essential for this type of cover, that is, the deployment door, to be releasably installed in the instrument panel opening so that it is separable and movable out of the way of the deploying air bag. The door, however, upon opening, must remain attached to the instrument panel so that it does not become a hazard to the safety of the vehicle occupants. A technique for fixing air bag deployment doors for passenger side air bags of this type is disclosed in U.S. Pat. No. 5,496,060 to Whited et al. that is assigned to the assignee of the present invention.

It is desirable for the deployment door to be secured to the instrument panel by retaining means which exert a force that is sufficiently great to resist the door being prematurely opened in order to maintain the integrity of the air bag installation. This force must also be small enough to assure that the door is released by the deploying air bag.

It is also desirable for the door to be maintained releasably installed by retaining means which reliably remain attached to the instrument panel upon deployment of the air bag. It is important that the retaining means do not become detached during air bag deployment or encroach upon the path of the air bag as it is deployed.

SUMMARY OF THE INVENTION

An object of the invention is to provide a retaining means or fastening system for releasably securing an air bag deployment door in a vehicle instrument panel, which means or system is operative to secure the door from being pried open under normal operating conditions thereby to maintain unimpaired the integrity of the air bag installation, but insures that the door is opened upon firing of the air bag gas generator and consequent deployment of the air bag.

Another object of the invention is to provide such a fastening system which is designed to release from the door upon deployment of the air bag.

A further object of the invention is to provide such a retaining means or fastening system that is characterized by effecting a reduction, in both cost and time, the installation of an air bag in a vehicle passenger instrument panel.

This invention features a fastening system for a passenger air bag installation in which an inflatable air bag is mounted in a recess in a vehicle instrument panel for deployment through a rectangular instrument panel opening which, typically, has a recessed abutment on its peripheral edges. The rectangular opening is closed by a rectangular deployment door that engages the abutment when installed and is secured to the instrument panel by the novel fastening system of this invention.

The fastening system comprises a plurality of fasteners that are mounted at spaced intervals on the instrument panel abutment, each fastener comprising a generally cylindrical bulbous type of joint at one end and a plurality of teeth having the shape of an "angled flute" or "Christmas tree" located at the opposite end. An anchor may be attached to the teeth at the opposite end of the fastener in order to ensure that the fastener will not become detached from the instrument panel upon deployment of the air bag. Each fastener includes a forked or bifurcated cylindrically shaped bulbous upper end or head portion for sliding and snapping into an individually associated one of a plurality of sockets, typically four, that are provided on the underside of the rectangular deployment door, one adjacent each corner thereof. The anchor formed at the opposite end of the fastener is a toggle, a mechanical lock, that is designed so as to be readily reduced in size and thereby easily inserted into the associated aperture in the instrument panel. Once, so inserted, the anchor is expanded, thereby to effect securement of the fastener to the instrument panel.

Upon firing of the air bag gas generator and deployment of the air bag, the bulbous portion on each of the four fasteners would be pulled from the associated socket located in the underside of the deployment door. The force required to pull the bulbous portion from the socket associated therewith would exceed the force required for an occupant to detach the door from the instrument panel of the vehicle, but would be lower than the force required to pull the teeth on the opposite end of each fastener from the aperture located in the instrument panel.

The teeth formed on the opposite end of the bulbous joint are formed in the fastener for gripping or grabbing, that is seizing and holding firmly, the inside of the aperture in the instrument panel. The pull force of the fastening teeth exceeds that of the bulbous joint. If the teeth in the fastener were to be pulled from the aperture in the instrument panel, the anchor, adjacent the teeth, when utilized, would prevent the fastener from being detached therefrom, thus providing greater assurance against this undesired result.

Upon deployment of the air bag, the bulbous portion socket would break, allowing the door to rotate out of the way, by use of a tether that is attached to the door. The fastener would remain attached to the instrument panel on air bag deployment.

The traditional air bag tethered door uses attachment clips for the retention thereof to the passenger instrument panel. The problem with the current systems is that they allow for the clips to become detached from the passenger instrument panel upon deployment of the air bag. In order to ensure that the fasteners will not become detached from the passenger instrument panel, inordinate effort is required. This increases both cost and time in installation of the air bag in the vehicle instrument panel.

The fasteners, according to the invention, preferably are made of a thermoplastic resin. A preferred material for making the fasteners comprises a nylon blend, such as Zytel ST80 HS, manufactured by du Pont Plastics. Any thermoplastic resin or blend of resins that has the proper impact properties and thermal properties, however, would be useful for manufacturing the fastener.

The various features of novelty that characterize the invention are pointed out with particularity in the claims that are annexed to and form a part of this specification. For a better understanding of the invention, its operating advantages, and specific objects attained by its use, reference is made to the accompanying drawings and descriptive matter in which a preferred embodiment of the invention is illustrated.

DETAILED DESCRIPTION OF A PREFERRED EMBODIMENT

Figure 1:
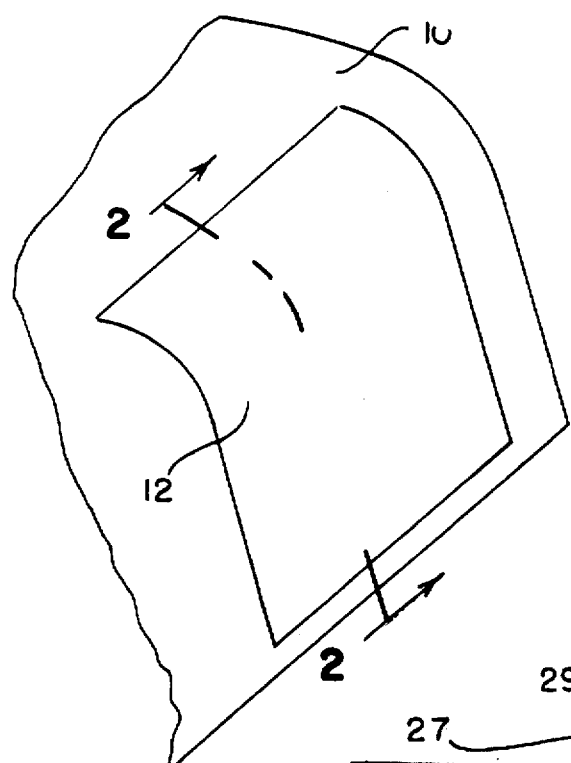
FIG. 1 is a perspective schematic view of the passenger instrument panel of a vehicle, including an air bag deployment opening that is closed by an air bag deployment door which is normally maintained in a closed position.

There is shown in FIG. 1 of the drawings a schematic representation of a vehicle passenger compartment that includes a passenger instrument panel 10 that is located immediately rearward of the windshield (not shown). An air bag deployment opening 12 is formed in the instrument panel 10.

Figure 2:
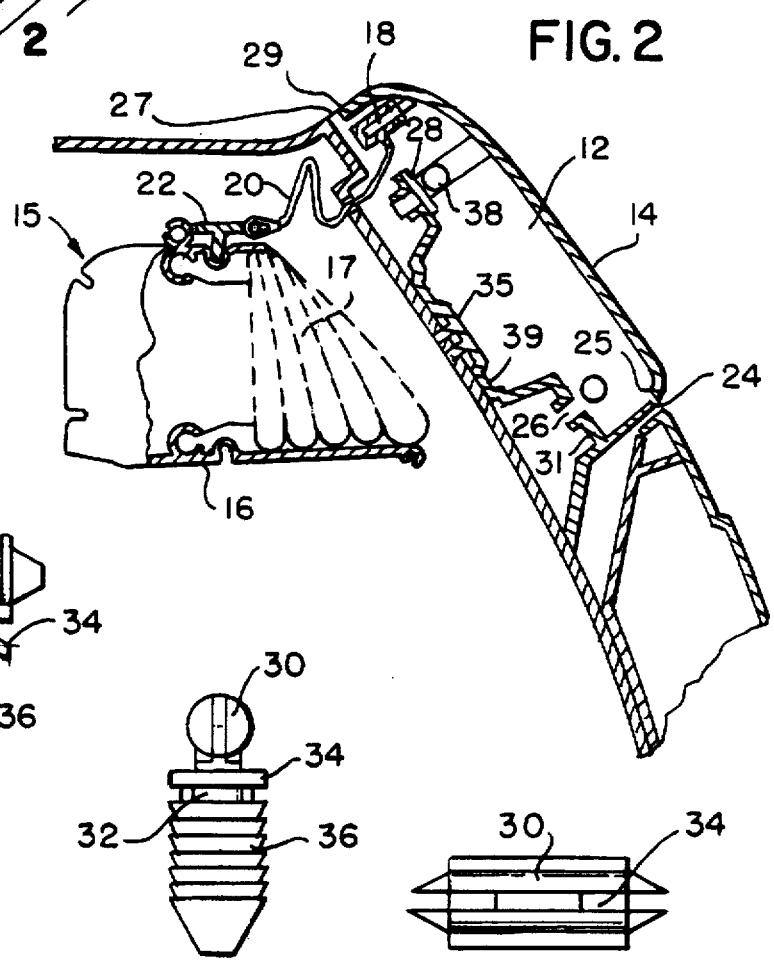
FIG. 2 is a cross sectional schematic view of FIG. 1 depicting the instrument panel, a door to cover the opening therein, an air bag module, and fixtures integrally formed in the underside of the door for facilitating the attachment to the door of door retaining fasteners.

In FIG. 2 the air bag deployment opening 12 is closed by a deployment door 14 that is positioned over an air bag module that is schematically illustrated by a block 15. The air bag module 15 is provided with a reaction canister 16 for housing and positioning a gas generator or air bag inflator (not shown), and an inflatable folded stored air bag 17 illustrated in dotted line formation and has an opening toward the opening 12 of the instrument panel 10.

The door 14 forms a continuation of the instrument panel 10 and comprises a rigid plastic substrate which may be covered by a decorative layer (not shown).

Figure 3:
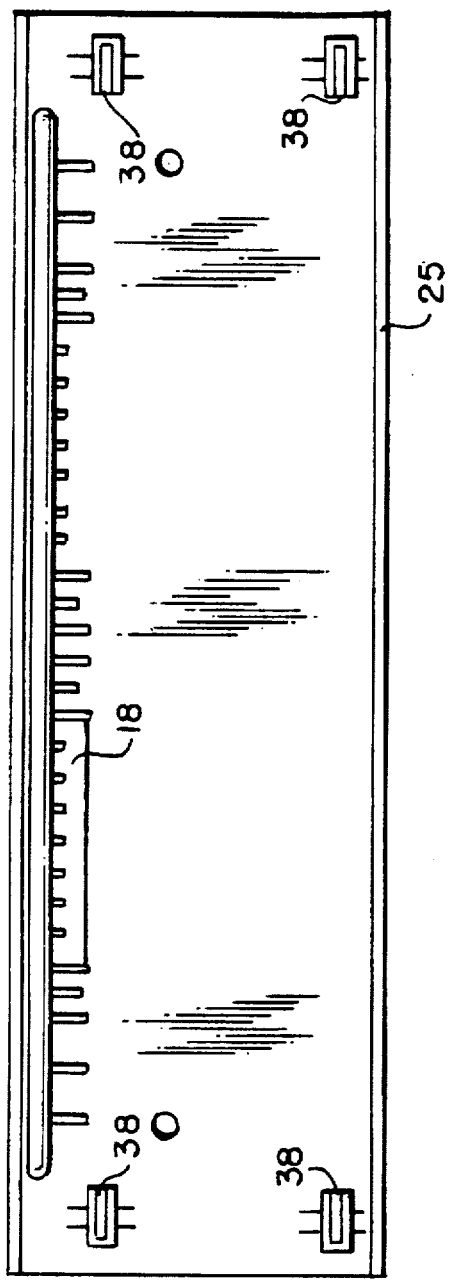
FIG. 3 is a view of the underside of the door of FIG. 2 showing the door to have a rectangular shape and including adjacent each of the four corners an integrally formed door retaining fixture.

On its underside, the door 14 incorporates an attachment comprising an integrally formed tether support bar 18, as shown in FIG. 3, for a tether 20, that is connected between the door 14 and the air bag module 16. The other end of the tether 20 is anchored to a bracket 22 on the air bag module 16.

The passenger instrument panel 10 is comprised of a rigid substrate that generally is covered by a foam layer (now shown) and a decorative layer (not shown). The panel 10 includes a flange 24, the edge of which, as shown in FIG. 2, forms an abutment engagement with the lower edge 25 of the door 14 along the length thereof, in the closed position.

An upper edge 27 of the instrument panel 10, as shown in FIG. 2, forms an abutment engagement with the upper edge 29 of the door 14, along the length thereof. The flange 24 and upper edge 27 are formed integrally with the instrument panel 10 and extend the full length of the air bag opening 12. Integrally formed with the flange 24 adjacent each side of the opening 12 is a generally U-shaped member or bracket 31, as illustrated in FIG. 2, that extends from a region adjacent the lower edge of the opening 12 to a region adjacent the upper edge thereof. A lower portion 33 of each of brackets 31 is in engagement with the instrument panel 10. A central portion 35 of each of the brackets 31 desirably also is mechanically attached to the instrument panel 10, as for example, by a suitable bolt (not shown).

At each end, each of the members 31 includes mounting apertures 26. In the exemplary embodiment of FIG. 2, four apertures 26 would be used for retaining the door 12 to the instrument panel 10. Apertures 26 mount fasteners 28 to secure the peripheral edge of door 14 as required to close the air bag deployment opening 12 of the instrument panel 10.

Figure 5:
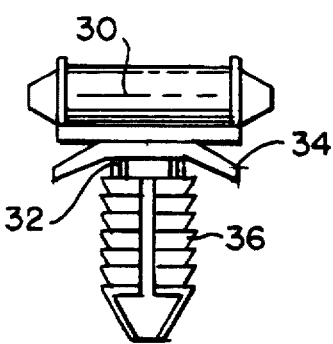
FIG. 5 is a detailed side view of the fastener shown in FIG. 2 illustrating the mounting and fastening means according to the invention.
Figure 6:
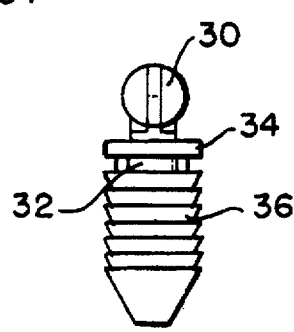
FIG. 6 is an end view of the fastener shown in FIG. 5.
Figure 7:
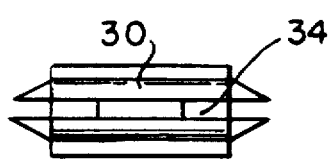
FIG. 7 is a top view of the fastener shown in FIG. 5.

Fasteners 28, as illustrated in FIGS. 5, 6 and 7, are made of a thermoplastic resin, and include a bifurcated compressible cylindrical bulbous head 30 which, at a central region is connected by a short rod portion 32 as shown in FIGS. 5 and 6 to juxtaposed spaced flared shoulder or wing portions 34 that are located side by side, at the distal ends of the fastener 28. At the opposite end of the fastener 28, slotted gripping teeth 36 are provided.

Figure 4:
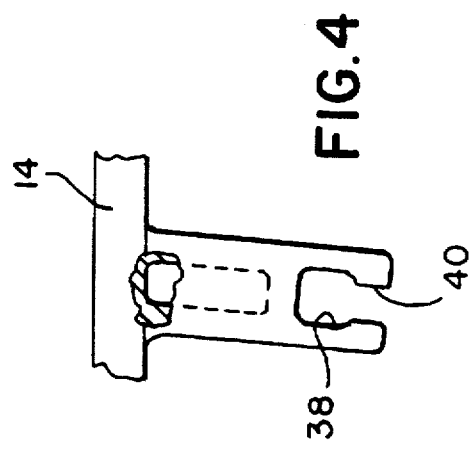
FIG. 4 is a cross sectional view of a cut away portion of the socket fixture featured in FIGS. 2 and 3 and showing the opening of a channel therein in which a compressible bifurcated cylindrical bulbous head of a door retaining fastener may be readily snapped in secured relation.

Referring additionally to FIGS. 2, 4 and 6, fasteners 28 are attached to the door 14 by sliding and snapping the bifurcated bulbous head 30 into an individually associated socket 38 that is integrally molded or otherwise formed in the underside of the door 14. The socket 38 is provided with an elongated slotted channel 40 the circumference of which is somewhat less than that of the unstressed bifurcated head 30. This enables the production of a firm socket locking action that is maintained due to the compression of the bifurcated bulbous head 30 of fastener 28 within a smaller space.

In the assembly of the door 14 to the instrument panel 10, four fasteners 28 are first positioned in a like number of sockets 38 provided on the underside of the door 14. The door 14 is thereafter assembled to the instrument panel 10 by alignment of each of the fasteners 28 with the aperture 26 in an associated one of the U-shaped brackets 31. When properly aligned, firm pressure of the door 14 against the instrument panel causes the slotted teeth 36 of each of the fasteners 28 to enter and engage the associated aperture 26 in a firm gripping relation. Such pressure of the door 14 tends to cause the normally downwardly bent shoulder or wing portions 34 of the fasteners to be bent upwards, that is moved into a position more horizontally disposed with respect to the position of the members 31 and the fastener bulbous head 30. The flared shoulder portions 34 provide height alignment and when straigntened out under pressure, as described, increase the gripping action of the teeth 36 to the wall of the aperture 26. Thus, each fastener 28 is securely anchored to the instrument panel 10.

An anchor that passes through an aperture 26 formed in a U-shaped bracket 31, or in the instrument panel itself, would ensure that if the slotted teeth 31 of the fastener 28 were to be pulled from the aperture 26, the anchor would retain the fastener 28 to the bracket 31 or to the instrument panel 10 and prevent the fastener 28 from encroaching upon the path of the air bag as the latter is deployed.

Figure 8:
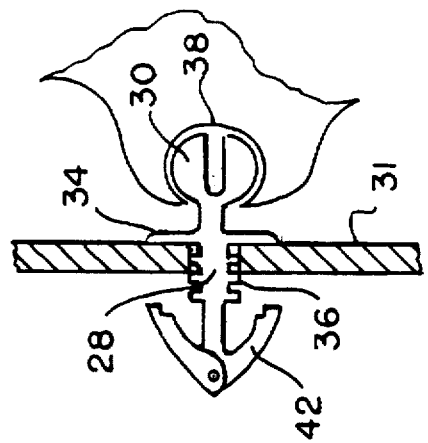
FIG. 8 is a cross sectional view illustrating the attachment of an anchor to the fastener to preclude detachment thereof from the instrument panel during air bag deployment.

Such an anchor is shown in FIG. 8 wherein firmly attached to the end of the gripping teeth 36 on a fastener 28 is a barb in the form of a toggle 42. The toggle 42 is designed to be passed through the aperture 26 and turned, thereby forming a mechanical lock.

In FIG. 8, the bulbous head 30 of the fastener is shown attached to a socket 38 formed in the underside of a door 14. The gripping teeth 36 and the toggle 42 are passed through an aperture 26, either in mounting bracket 31, as shown in FIG. 2, or if desired, directly in the instrument panel 10 of the vehicle.

Upon firing of the gas generator in the module 15, typically responsively to the onset of a collision, and the resultant deployment of the protective air bag 17 as it is inflated, the bulbous head 30 of each fastener 28 would be pulled away from each of the sockets 38 associated therewith that are located in the door 14 and are integrally formed therewith, as indicated in FIGS. 3 and 4.

The force required to pull the bulbous head 30 from the socket 38 would exceed the force required for an occupant of the vehicle to detach the door 14 from the instrument panel 10, but would be lower than the force required to pull the teeth 36 on the opposite end of the fastener 28 from the aperture 26 located in the bracket 31 that is integral with the instrument panel 10. The pull force of the fastening teeth 36 will exceed that of the arrangement of the bulbous head 30 and socket 38.

Upon deploying the air bag, the bulbous head/socket arrangement would break allowing the door to rotate out of the way by use of the tether 20 attached to the door 14. The fasteners 28 would remain in the instrument panel 10 on deployment of the air bag 17 and thus are prevented from posing a hazard to occupants of the vehicle.

If greater assurance is desired for guarding against any of the fasteners 28 becoming loose and flying around in the vehicle and posing a hazard to the occupants, a compressible toggle bolt may be attached to the portion of each fastener having teeth 36.

Thus, in accordance with the invention, there has been provided a fastening system for releasably securing an air bag deployment door in a vehicle instrument panel, which system is operative to secure the door from being pried open under normal operating conditions in order to maintain unimpaired the integrity of the air bag installation, but insures that the door is opened upon firing of the air bag module and resultant deployment of the inflated air bag.

With this description of the invention in detail, those skilled in the art will appreciate that modifications may be made to the invention without departing from the spirit thereof. Therefore, it is not intended that the scope of the invention be limited to the specific embodiment that is illustrated and described. Rather, it is intended that the scope of the invention be determined by the appended claims and their equivalents.

What is claimed is:

1. In an air bag installation for a vehicle in which an inflatable air bag is mounted in a recess in the instrument panel for deployment through a rectangular opening in said instrument panel, having a peripheral recessed abutment, which is closed by a rectangular door that engages the abutment to form a relevant fit when installed and is secured to the instrument panel, retaining means for releasably securing the door installed in the panel opening, comprising bracket means, having a plurality of spaced apertures, supported in said recess by said instrument panel, a plurality of thermoplastic resin fasteners secured to a plurality of integral channels molded in the underside of the door, each fastener having, beginning at one end thereof, a bifurcated bulbous head, juxtaposed spaced winged shoulder portions extending from said head, and a portion comprising a plurality of gripping teeth formed as an angled flute for securing the door to the instrument panel inserted through said apertures in said bracket means, said channels molded into the underside of the door having slotted ends for releasably engaging the bulbous head of the fastener for securing the door against inadvertent premature disengagement from the instrument panel, whereby the application of sufficient force to said door causes disengagement of the bulbous head of the fasteners from the channels molded in the underside of the door thus freeing the door to facilitate its opening.

2. The retaining means of claim 1 wherein said bracket means has a plurality of spaced apertures for receiving a matched number of fasteners, each fastener being characterized by a portion having a generally flute shape that is endwise convergent to facilitate installation by insertion through said apertures.

3. The retaining means of claim 2, wherein there are four fasteners mounted in said spaced apertures.

4. The retaining means of claim 1, wherein each fastener has a toggle bolt for engagement with said bracket means to prevent inadvertent premature disengagement of the door.

5. The retaining means of claim 1, wherein each fastener is made of thermoplastic resin.

6. The retaining means of claim 4 wherein the thermoplastic resin comprises a nylon blend.

7. The retaining means of claim 1, wherein the juxtaposed spaced winged shoulder portions of each of said fasteners is normally bent downwards so that upon installation of said gripping teeth portion of each of said fasteners in said apertures upward bending of said shoulder portions increases the gripping action of said gripping teeth on the walls of said apertures.

8. In an air bag installation for a vehicle in which an air bag is mounted in a recess in the instrument panel for deployment through a rectangular panel opening, having a recessed peripheral abutment, the opening being closed by a rectangular door that engages the abutment when installed, retaining means for releasably maintaining the door installed in the panel opening, comprising bracket means, having a plurality of spaced apertures, supported in said recess by said instrument panel, a plurality of fasteners mounted along the periphery of the door, each fastener having a bulbous head, juxtaposed spaced winged shoulder portions extending from the said head, and a portion comprising a plurality of gripping teeth formed as an angled flute for attachment of the fastener through the apertures to the instrument panel, a plurality of integral channels molded into the underside of the door to inhibit inadvertent door opening, interengageable surfaces of the door and bracket means providing relevant fit of the door and instrument panel, whereby inflation of the air bag causes disengagement of the interengageable surfaces thus freeing the door to enable door opening, while retaining the fasteners mounted to said bracket means and thereby said instrument panel.

9. The retaining means of claim 8, wherein each fastener is made of thermoplastic resin.

10. The retaining means of claim 9, wherein the thermoplastic resin comprises a nylon blend.

11. The retaining means of claim 1, wherein the juxtaposed spaced winged shoulder portions of each of said fasteners is normally bent downwards to that upon installation of said gripping teeth portion of each of said fasteners in said apertures upward bending of said shoulder portions increases the gripping action of said gripping teeth on the walls of said apertures.

* * * * *